United States Patent
Suzuki (10) Patent No.: US 10,608,535 B2
(45) Date of Patent: Mar. 31, 2020

(54) CONTROL DEVICE FOR STEP-UP CONVERTER

(71) Applicant: KEIHIN CORPORATION, Tokyo (JP)

(72) Inventor: Takami Suzuki, Utsunomiya (JP)

(73) Assignee: KEIHIN CORPORATION, Tokyo (JP)

( * ) Notice: Subject to any disclaimer, the term of this patent is extended or adjusted under 35 U.S.C. 154(b) by 0 days.

(21) Appl. No.: 16/447,054

(22) Filed: Jun. 20, 2019

(65) Prior Publication Data

US 2020/0044565 A1 Feb. 6, 2020

(30) Foreign Application Priority Data

Aug. 3, 2018 (JP) ................................. 2018-147034

(51) Int. Cl.
*H02M 3/158* (2006.01)
*H02M 7/48* (2007.01)
*H02M 1/00* (2006.01)

(52) U.S. Cl.
CPC ............. *H02M 3/158* (2013.01); *H02M 7/48* (2013.01); *H02M 2001/007* (2013.01); *H02M 2001/0019* (2013.01)

(58) Field of Classification Search
CPC ......... H02M 3/158; H02M 2001/0019; H02M 2001/007; H02M 7/48
See application file for complete search history.

(56) References Cited

U.S. PATENT DOCUMENTS

| | | | | |
|---|---|---|---|---|
| 8,583,265 B1* | 11/2013 | Schulz | ...................... | H02P 6/10 318/400.14 |
| 8,649,887 B2* | 2/2014 | Schulz | .................... | H02P 23/04 290/40 D |
| 8,866,430 B2* | 10/2014 | Takamatsu | .............. | H02M 1/42 318/455 |
| 9,035,594 B2* | 5/2015 | Takamatsu | ............ | H02M 3/156 318/610 |
| 9,143,066 B2* | 9/2015 | Yang | ......................... | H02P 6/18 |
| 2012/0068646 A1* | 3/2012 | Takamatsu | .............. | B60L 50/51 318/400.26 |

(Continued)

FOREIGN PATENT DOCUMENTS

JP 2017046495 A 3/2017

*Primary Examiner* — Fred E Finch, III
*Assistant Examiner* — Rafael O. De León Domenech
(74) *Attorney, Agent, or Firm* — Cantor Colburn LLP (57) ABSTRACT

A control device for a step-up converter which controls the step-up converter connected between a load and a DC power source, the control device includes a voltage control unit, a current command generation unit, a duty estimator, and a pole zero cancellation control unit. The voltage control unit performs a control arithmetic operation on the basis of a calculated value, obtained by performing a proportional arithmetic operation and an integration arithmetic operation on a difference between a voltage value on the load side and a voltage command value, and a value generated by the pole zero cancellation control unit. The current command generation unit generates a reactor current command value on the basis of an arithmetic result of the voltage control unit and a reciprocal of a duty estimation value.

7 Claims, 5 Drawing Sheets

(56) References Cited

U.S. PATENT DOCUMENTS

| | | | | |
|---|---|---|---|---|
| 2012/0206949 A1* | 8/2012 | Owen | ............... | H02P 9/48 |
| | | | | 363/127 |
| 2014/0210397 A1* | 7/2014 | Takenouchi | ............ | H02P 25/18 |
| | | | | 318/724 |
| 2015/0311844 A1* | 10/2015 | Yang | ............... | H02P 6/18 |
| | | | | 318/400.02 |
| 2015/0372628 A1* | 12/2015 | Oono | ............... | B60L 15/20 |
| | | | | 318/801 |

* cited by examiner

CONTROL DEVICE FOR STEP-UP CONVERTER

CROSS REFERENCE TO RELATED APPLICATION

The present application claims priority under 35 U.S.C. § 119 to Japanese Patent Application No. 2018-147034, filed on Aug. 3, 2018, the entire content of which is incorporated herein by reference.

BACKGROUND OF THE INVENTION

Description of Related Art

As is well known, in vehicles equipped with batteries, and the like, step-up converters that step up a battery voltage connected to a primary side and output the stepped-up battery voltage to a secondary side is used. Such step-up converters are controlled by control devices controlling step-up converters on the basis of a secondary-side voltage value as disclosed in, for example, Japanese Unexamined Patent Application, First Publication No. 2017-46495.

Incidentally, in order to achieve stable supply of power to a load connected to a secondary side of a step-up converter, it is necessary to suppress an unintentional fluctuation in a secondary-side voltage value of the step-up converter. For example, a step-up converter including a switching element includes a disturbance component caused by an off-period ratio (off duty) of the switching element when viewed from a control device side. For this reason, it is possible to suppress the influence of the disturbance component caused by the off duty by a control device multiplying a current command value by a reciprocal of the off duty.

However, it is not possible to completely eliminate the influence of the disturbance component caused by the off duty by only multiplying the current command value by the reciprocal of the off duty. For this reason, in Japanese Unexamined Patent Application, First Publication No. 2017-46495, a fluctuation in a secondary-side voltage value is further suppressed by making a control gain variable in accordance with a reciprocal of an off duty in a voltage control unit of a control device.

However, in a case where a fluctuation in a secondary-side voltage value is suppressed as in Japanese Unexamined Patent Application, First Publication No. 2017-46495, it is necessary to incorporate a mechanism for making a control gain of a voltage control unit variable in accordance with a reciprocal of an off duty in a control device, which complicates the design of the control device.

SUMMARY OF THE INVENTION

The present invention is contrived in view of the above-described problems, and an object thereof is to enable the influence of a disturbance component on control of a step-up converter to be further suppressed without making a control gain in a voltage control unit variable and to stabilize the supply of power to a load.

The present invention adopts the following configurations as measures for solving the above-described problem.

A first invention adopts a configuration of a control device for a step-up converter which controls the step-up converter connected between a load and a DC power source, the control device including a voltage control unit that performs a control arithmetic operation for adjusting a voltage value on the load side of the step-up converter to a voltage command value, a current command generation unit that generates a reactor current command value indicating a target current value to be applied to a DC reactor of the step-up converter on the basis of an arithmetic result of the voltage control unit, a duty estimator that calculates a duty estimation value which is an estimation value of an off duty indicating an off period of a switching element of the step-up converter disposed on a negative electrode side of the DC power source, and a pole zero cancellation control unit that stores a pole zero cancellation gain for forming a delay element in a system including the voltage control unit and a load-side capacitor of the step-up converter and generates a value based on the pole zero cancellation gain, in which the voltage control unit performs the control arithmetic operation on the basis of an arithmetic value, obtained by performing a proportional arithmetic operation and an integration arithmetic operation on a difference between a voltage value on the load side and the voltage command value, and a value generated by the pole zero cancellation control unit, and the current command generation unit generates the reactor current command value on the basis of the arithmetic result of the voltage control unit and a reciprocal of the duty estimation value.

A second invention according to the first invention adopts a configuration in which the pole zero cancellation control unit generates a value obtained by multiplying the voltage value on the load side by the pole zero cancellation gain, and the voltage control unit includes a subtractor that subtracts the value generated by the pole zero cancellation control unit from the arithmetic value obtained by performing the proportional arithmetic operation and the integration arithmetic operation on the difference between the voltage value on the load side and the voltage command value.

A third invention according to the first or second invention adopts a configuration in which the pole zero cancellation gain is set to a value equivalent to a DC load resistance.

A fourth invention according to any one of the first to third inventions adopts a configuration in which the control device further includes an approximation disturbance observer that calculates a load current AC component estimation value which is an estimation value of an AC component of a load current on the basis of the voltage value on the load side, in which the current command generation unit generates the reactor current command value on the basis of the load current AC component estimation value, in addition to the arithmetic result of the voltage control unit and the reciprocal of the duty estimation value.

A fifth invention according to any one of the first to fourth inventions adopts a configuration in which a proportional gain, an integration gain, and a pole zero cancellation gain of the voltage control unit are set such that the system including the voltage control unit and the load-side capacitor of the step-up converter has a primary delay characteristic.

A sixth invention according to the fifth invention adopts a configuration in which the proportional gain is set on the basis of a capacitance value and a cut-off angle frequency of the load-side capacitor of the step-up converter, and the integration gain is set on the basis of the pole zero cancellation gain and the cut-off angle frequency.

A seventh invention according to any one of the first to sixth inventions adopts a configuration in which the control device further includes a current control unit that performs a control arithmetic operation for adjusting a reactor current value indicating a current value to be applied to the DC reactor to the reactor current command value to calculate a reactor voltage command value indicating a target voltage value to be applied to the DC reactor, and a control signal generation unit that generates a control signal of the step-up converter on the basis of the voltage value on the load side, a voltage value on the DC power source side of the step-up converter, and the reactor voltage command value, in which the current control unit calculates an arithmetic value, obtained by performing a proportional arithmetic operation using a variable proportional gain set to be variable on the basis of the cut-off angle frequency and an inductance value of the DC reactor and an integration arithmetic operation using an integration gain set on the basis of the cut-off angle frequency and a combined resistance value of a DC resistance value of the DC reactor and an on-resistance of the switching element of the step-up converter on a difference between the reactor current value and the reactor current command value, as the reactor voltage command value.

According to the present invention, a delay element is formed in a system including a voltage control unit and a load-side capacitor of a step-up converter using a pole zero cancellation gain. For this reason, a residual component of a disturbance component, caused by an off duty, which remains even when a current command value is multiplied by a reciprocal of an off duty can be absorbed through an integration arithmetic operation of the voltage control unit. Therefore, according to the present invention, it is possible to further suppress the influence of a disturbance component on control of a step-up converter without making a control gain in a voltage control unit variable and thus to stabilize the supply of power to a load.

DETAILED DESCRIPTION OF THE INVENTION

Hereinafter, an embodiment of a control device for a step-up converter according to the present invention will be described with reference to the accompanying drawings.

Figure 1:
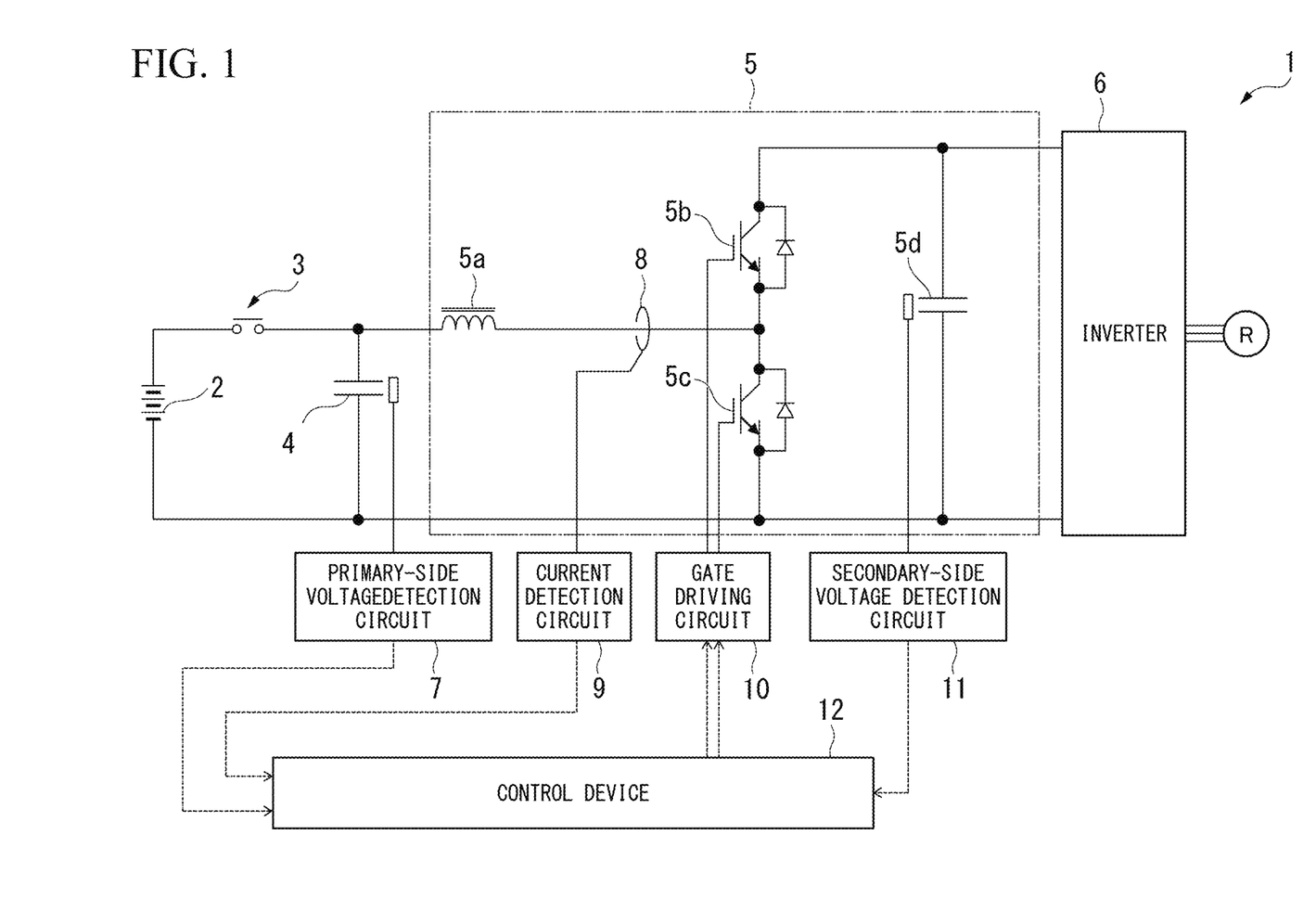
FIG. 1 is a circuit diagram illustrating a schematic configuration of a power system including a control device in an embodiment of the present invention.

FIG. 1 is a circuit diagram illustrating a schematic configuration of a power system 1 including a control device 12 which is an embodiment of a control device for a step-up converter in the present embodiment. As illustrated in the drawing, the power system 1 includes a battery 2 (DC power source), a contactor 3, a primary-side capacitor 4, a step-up/step-down converter 5 (step-up converter), an inverter 6, a primary-side voltage detection circuit 7, a current sensor 8, a current detection circuit 9, a gate driving circuit 10, a secondary-side voltage detection circuit 11, and a control device 12.

Meanwhile, in the present embodiment, the power system 1 includes a step-up/step-down converter 5 capable of stepping up and stepping down power to make it possible to accumulate regenerative power output from a load R in the battery 2, and the control device 12 performs step-up control and step-down control. However, in a case where it is not necessary to accumulate regenerative power in the battery 2, the step-up/step-down converter 5 is set to be a step-up converter, and the control device 12 performs only step-up control out of step-up control and step-down control. Since the present embodiment is characterized by step-up control, step-down control of the control device 12 will not be described in the following description.

The battery 2 is an assembled battery in which a plurality of battery cells (unit cells) are connected to each other in series and outputs high-voltage power (DC power) of several hundred volts. The contactor 3 is a switch which is provided on a positive terminal side of the battery 2 and switches a connection state between the positive terminal of the battery 2 and the step-up/step-down converter 5 between connection and non-connection.

The primary-side capacitor 4 is a capacitor provided on a primary side (the battery 2 side) of the step-up/step-down converter 5. Meanwhile, the battery 2 side and the load R side with respect to the step-up/step-down converter 5 will be referred to as a primary side and a secondary side, respectively. The primary-side capacitor 4 smooths an input voltage input from the battery 2 through the contactor 3.

The step-up/step-down converter 5, which is connected between the load R and the battery 2, steps up an input voltage input from the battery 2 at a predetermined step-up ratio to output the stepped-up voltage to the inverter 6, and steps down a regenerative voltage input from the inverter 6 at a predetermined step-down ratio to output the stepped-down regenerative voltage to the battery 2. The step-up/step-down converter 5 includes a DC reactor $5a$, an upper arm $5b$, a lower arm $5c$, and a secondary-side capacitor $5d$ (load-side capacitor).

The DC reactor $5a$ is connected to a positive terminal of the battery 2. The upper arm $5b$ includes a transistor in which an emitter is connected to the positive terminal side of the battery 2 through the DC reactor $5a$, and a reflux diode that bypasses the transistor. The lower arm $5c$ includes a transistor in which a collector is connected to the positive terminal side of the battery 2 through the DC reactor $5a$ and an emitter is connected to a negative terminal side of the battery 2, and a reflux diode that bypasses the transistor. The secondary-side capacitor $5d$ is connected to a secondary side (the load R side) with respect to the upper arm $5b$ and the lower arm $5c$, and smooths an input voltage input from the battery 2 through the upper arm $5b$ and the lower arm $5c$.

The inverter 6 is a power conversion circuit which converts input power input from the step-up/step-down converter 5 into AC power and supplies the AC power to the load R such as a motor. Meanwhile, it is also possible to adopt a configuration in which a plurality of loads R are connected to the power system 1. In this case, a plurality of inverters 6 are installed by providing the inverter 6 for each load R.

The primary-side voltage detection circuit 7 is a voltage sensor that detects a voltage of the primary-side capacitor 4, that is, an inter-terminal voltage of the primary-side capacitor 4, and outputs a detected value (primary-side voltage value $v_p$) to the control device 12. The current sensor 8 is a sensor that detects a current between the DC reactor $5a$ and a switching circuit (the upper arm 5*b* and the lower arm 5*c*), and outputs a detected value (reactor current value $i_L$) to the control device 12.

The gate driving circuit 10 is connected to a gate of the transistor of the upper arm 5*b* and a gate of the transistor of the lower arm 5*c*, and performs switching between the transistor of the upper arm 5*b* and the transistor of the lower arm 5*c* on the basis of a driving command input from the control device 12. The secondary-side voltage detection circuit 11 is a voltage sensor that detects a voltage of the secondary-side capacitor 5*d*, that is, an inter-terminal voltage of the secondary-side capacitor 5*d*, and outputs a detected value (secondary-side voltage value $v_s$) to the control device 12.

The control device 12 is a device that controls the step-up/step-down converter 5, and controls turn-on and turn-off of a switching circuit (the transistor of the upper arm 5*b* and the transistor of the lower arm 5*c*) of the step-up/step-down converter 5 through the gate driving circuit 10 on the basis of the primary-side voltage value $v_p$ input from the primary-side voltage detection circuit 7, the secondary-side voltage value $v_s$ input from the secondary-side voltage detection circuit 11, the reactor current value $i_L$ input from the current sensor 8, and the like.

Figure 2:
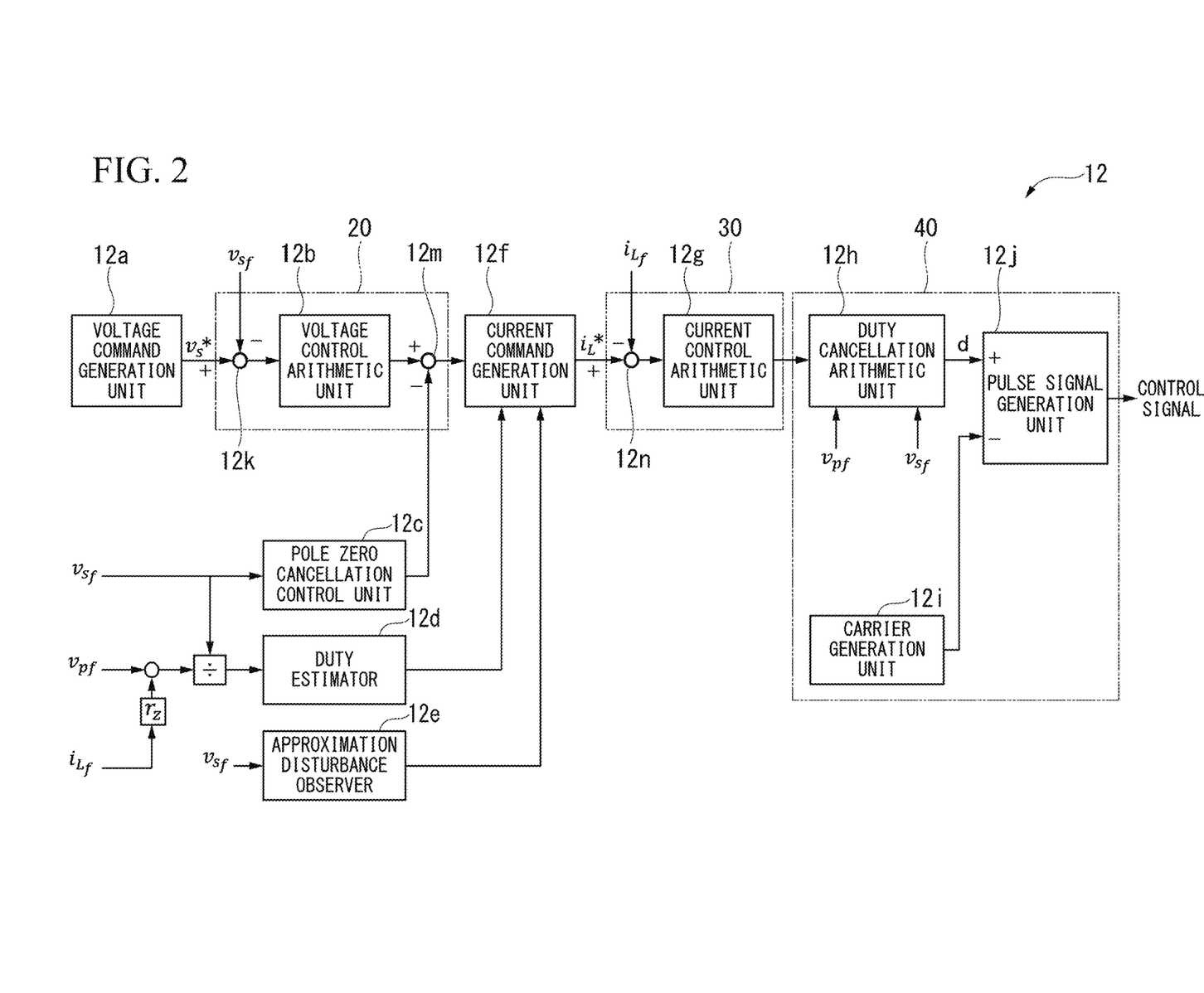
FIG. 2 is a block diagram illustrating functional components of a control device in the embodiment of the present invention.

FIG. 2 is a block diagram illustrating functional components of the control device 12. As illustrated in the drawing, the control device 12 includes a voltage command generation unit 12*a*, a voltage control arithmetic unit 12*b*, a pole zero cancellation control unit 12*c*, a duty estimator 12*d*, an approximation disturbance observer 12*e*, a current command generation unit 12*f*, a current control arithmetic unit 12*g*, a duty cancellation arithmetic unit 12*h*, a carrier generation unit 12*i*, and a pulse signal generation unit 12*j*.

Here, a method of designing the control device 12 will be described before details of the control device 12 having such a configuration are described. First, the step-up/step-down converter 5 is modeled by a state averaging method, and the modeled step-up/step-down converter 5 is combined with a circuit on a primary side of the modeled step-up/step-down converter 5 (referred to as a primary-side battery circuit), thereby creating a plant model. The control device 12 of the present embodiment is designed such that a term indicating a disturbance component included in a transfer function representing the plant model is cancelled and the transfer function is degenerated.

Figure 3:
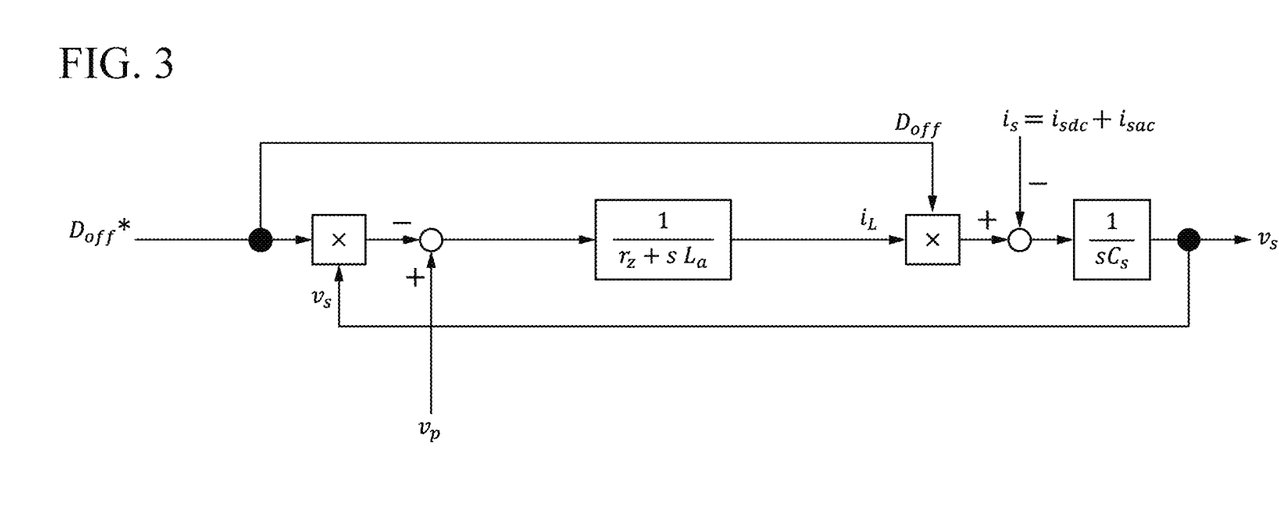
FIG. 3 is a block diagram illustrating a modeled step-up/step-down converter which is an object to be controlled by a control device in the embodiment of the present invention.

When the step-up/step-down converter 5 is modeled by a state averaging method, a block diagram illustrated in FIG. 3 is obtained. Meanwhile, in FIG. 3, $D_{off}^*$ indicates a command value of a ratio of an off period (hereinafter referred to as an off duty) in one cycle which is obtained by combining an on period and an off period of the lower arm 5*c*. $v_s$ indicates a secondary-side voltage value. $v_p$ indicates a primary-side voltage value. $r_z$ indicates a combined resistance value of an internal resistance value $r_L$ of the DC reactor 5*a* and on-resistance values $r_{SW}$ of the upper arm 5*b* and the lower arm 5*c*. $L_a$ indicates an inductance value of the DC reactor 5*a*. $i_L$ indicates a reactor current value. $D_{off}$ indicates an off duty. $i_s$ indicates a load current value. $C_s$ indicates a capacitance value of the secondary-side capacitor 5*d*. s indicates a Laplace operator.

Figure 4:
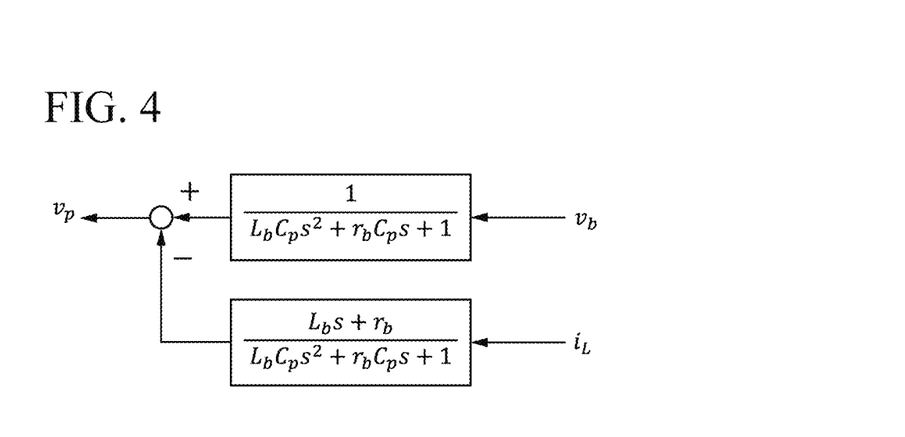
FIG. 4 is a block diagram illustrating a modeled primary-side battery circuit which is an object to be controlled by the control device in the embodiment of the present invention.

The primary-side battery circuit is a circuit including the battery 2 and the primary-side capacitor 4. When the primary-side battery circuit is modeled, a block diagram illustrated in FIG. 4 is obtained. Meanwhile, in FIG. 4, $C_p$ indicates a capacitance value of the primary-side capacitor. $L_b$ indicates an internal inductance value of a battery impedance. $r_b$ indicates an internal resistance value of the battery impedance. $v_b$ indicates a battery voltage. Other signs are the same as those in FIG. 3.

Figure 5:
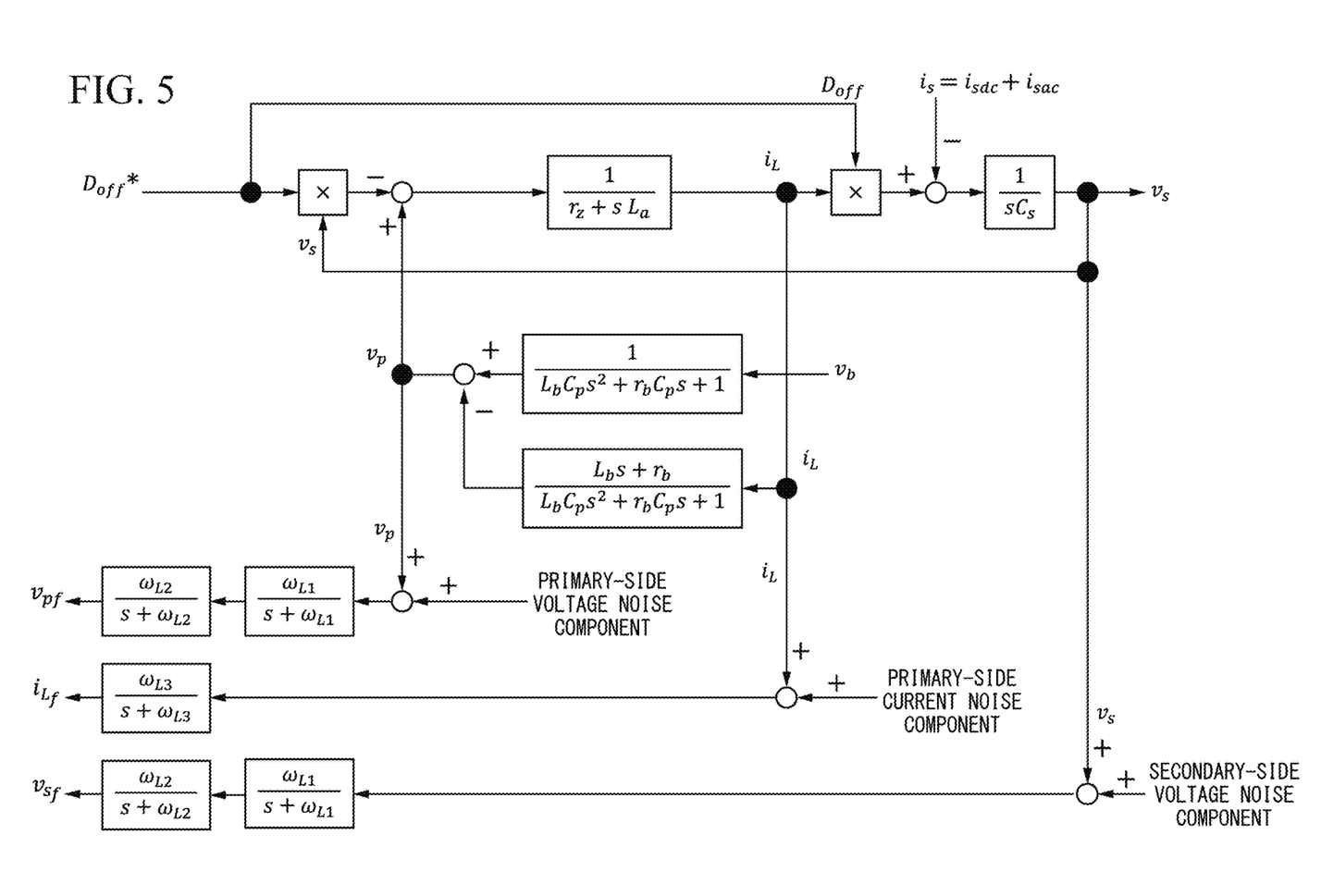
FIG. 5 is a block diagram illustrating a modeled plant including the step-up/step-down converter and the primary-side battery circuit which are objects to be controlled by the control device in the embodiment of the present invention.

When the step-up/step-down converter 5 and the primary-side battery circuit are combined with each other, a block diagram illustrated in FIG. 5 is obtained. An off duty $D_{off}$, a secondary-side voltage value $v_s$, a primary-side voltage value $v_p$ and a load current value $i_s$, illustrated in FIG. 5 which are input to the step-up/step-down converter 5, are disturbance components when viewed from the control device 12. That is, in a case where no correspondence is made to the off duty $D_{off}$, the secondary-side voltage value $v_s$, the primary-side voltage value $v_p$, and the load current value $i_s$, a state where an error component is included in power supplied to the inverter 6 is set.

Consequently, in the present embodiment, the control device 12 is designed such that the influence of the off duty $D_{off}$, the secondary-side voltage value $v_s$, the primary-side voltage value $v_p$, and the load current value $i_s$ which are input to the step-up/step-down converter 5 as disturbance components is cancelled.

Meanwhile, error components caused by sensor characteristics or the like are included in detected values of the primary-side voltage detection circuit 7, the current detection circuit 9, and the secondary-side voltage detection circuit 11. For this reason, as illustrated in FIG. 5, the power system 1 includes a low pass filter circuit for eliminating detected values of the primary-side voltage detection circuit 7, the current detection circuit 9, and the secondary-side voltage detection circuit 11 as hardware. In FIG. 5, $\omega_{L1}$, $\omega_{L2}$, and $\omega_{L3}$ indicate cut-off angle frequencies.

A method of canceling the influence of the off duty $D_{off}$, the secondary-side voltage value $v_s$, the primary-side voltage value $v_p$, and the load current value $i_s$ will be described in more detail. State equations applied in the state averaging method of the step-up/step-down converter 5 illustrated in FIG. 3 are the following Equations (1) and (2).

$$\frac{di_L}{dt} = -\frac{1}{L_a} r_z i_L - \frac{1}{L_a} D_{off} v_s + \frac{1}{L_a} v_p \tag{1}$$

$$\frac{dv_s}{dt} = \frac{1}{C_s} D_{off} i_L - \frac{1}{C_s} i_s \tag{2}$$

Here, when Laplace conversion is performed focusing on a differential equation of a reactor current value $i_L$ of Equation (1), the following Equation (3) is obtained, and the following Equation (4) is obtained when equation deformation is further performed thereon.

$$si_L = -\frac{1}{L_a} r_z i_L - \frac{1}{L_a} D_{off} v_s + \frac{1}{L_a} v_p \tag{3}$$

$$D_{off} v_s = -r_z i_L - L_a s i_L v_p \tag{4}$$

Since a term with a Laplace operator is a term negligible when considering a steady state, the following Equation (5) is obtained when approximation is performed thereon. Meanwhile, it is assumed that a neglected term is included in a disturbance term $d_2$ which cannot be cancelled due to decoupling, and the influence thereof is cancelled by a method to be described later (pole zero cancellation).

$$D_{off} \approx -r_z \frac{i_L}{v_s} + \frac{v_p}{v_s} \quad (5)$$

Accordingly, when replacement with variables handled by the control device 12 is performed, Equation (6) is obtained. Meanwhile, in Equation (6), $D_{off}^{est}$ will be referred to as a duty estimation value below. That is, the control device 12 performs arithmetic operation using a duty estimation value $D_{off}^{est}$ on the basis of Equation (6), so that it is possible to perform decoupling of an off duty $D_{off}$ input as a disturbance component by the step-up/step-down converter 5. Therefore, in the present embodiment, the control device 12 includes the duty estimator 12d that calculates a duty estimation value $D_{off}^{est}$ in order to perform decoupling of the off duty $D_{off}$.

$$D_{off}^{est} = -r_z \frac{i_{Lf}}{v_{sf}} + \frac{v_{pf}}{v_{sf}} \quad (6)$$

Next, in order to cancel the influence of the secondary-side voltage value $v_s$ and the primary-side voltage value $v_p$, the control device 12 may perform a process of dividing a command value $D_{off}^*$ of an off duty by a feedback value $v_{sf}$ of the secondary-side voltage value $v_s$ and subtracting a feedback value $v_p f$ of a primary-side voltage value $v_p$ from the command value $D_{off}^*$ of the off duty. This process can be expressed by the following Equation (7). Meanwhile, in Equation (7), $v_L^*$ indicates a reactor voltage command value and is a command value generated by the current command generation unit 12f in the control device 12.

$$D_{off}^* = 1 - \frac{1}{v_{sf}}(v_L^* - v_{pf} + v_{sf}) = -\frac{1}{v_{sf}}(v_L^* - v_{pf}) \quad (7)$$

That is, the control device 12 performs arithmetic processing based on Equation (7), so that it is possible to perform decoupling between the secondary-side voltage value $v_s$ and the primary-side voltage value $v_p$ which are input by the step-up/step-down converter 5 as disturbance components. Therefore, in the present embodiment, the control device 12 includes the duty cancellation arithmetic unit 12h that performs arithmetic processing of Equation (7) in order to perform decoupling between the secondary-side voltage value $v_s$ and the primary-side voltage value $v_p$ which are input as disturbance components.

Meanwhile, in the step-up/step-down converter 5 modeled as illustrated in FIG. 5, a signal value $y_{tmp}$ obtained by receiving the secondary-side voltage value $v_s$ and the primary-side voltage value $v_p$ with respect to the off duty $D_{off}$ is expressed by the following Equation (8).

$$y_{tmp} = v_p - D_{off} v_s \quad (8)$$

Here, values handled by the control device 12 and values handled by a plant include errors due to an acquisition error, a dead time error, and the like. For this reason, it is assumed that the errors can be expressed by the following Equation (9), the following Equation (10), and the following Equation (11).

$$D_{off} = D_{off}^* \Delta D_{off} \quad (9)$$

$$v_{pf} = \left(\frac{\omega_{L1}}{s + \omega_{L1}}\right)\left(\frac{\omega_{L2}}{s + \omega_{L2}}\right) v_p \approx v_p - \Delta v_p \quad (10)$$

$$v_{sf} = \left(\frac{\omega_{L1}}{s + \omega_{L1}}\right)\left(\frac{\omega_{L2}}{s + \omega_{L2}}\right) v_p \approx v_s - \Delta v_s \quad (11)$$

Considering Equation (9) to Equation (11), the above-described signal value $y_{tmp}$ can be expressed as the following Equation (12). Meanwhile, since terms with $\Delta$ can be regarded as minute variations, the terms are collectively treated as a disturbance term $d_1$.

$$y_{tmp} = v_L^* + \left\{\frac{\Delta v_s}{v_{sf}}(v_L^* - v_{pf}) + \Delta v_p + \Delta D_{off} v_s\right\} \approx v_L^* + d_1 \quad (12)$$

That is, as described above, when the influence of the secondary-side voltage value $v_s$ and the primary-side voltage value $v_p$ are cancelled, a disturbance term $d_1$ is generated. Regarding the disturbance term $d_1$, the influence thereof can be cancelled by making a proportional gain variable in the current control arithmetic unit 12g as will be described later.

A method of canceling the influence of the disturbance term $d_1$ will be described. An open loop of a block including the current control arithmetic unit 12g performing arithmetic operation based on PI control is designed as the following Equation (13). Meanwhile, in Equation (13), $k_{pc}$ indicates a proportional gain of the current control arithmetic unit 12g. $\omega_{cc}$ indicates a cut-off angle frequency. $T_{ic}$ is a value obtained by dividing the inductance value $L_a$ by the combined resistance value $r_z$.

$$G_{cc}^o(s) = \left\{k_{pc}\left(1 + \frac{1}{T_{ic}s}\right)\right\}\left(\frac{1}{r_z + sL_a}\right) = \omega_{cc}\frac{1}{s} \quad (13)$$

From Equation (13), the proportional gain $k_{pc}$ is as expressed by the following Equation (14).

$$k_{pc} = L_a \omega_{cc} \quad (14)$$

In addition, a closed loop of the block is as expressed by the following Equation (15) when using Equation (13) and Equation (14). Meanwhile, in Equation (15), $H_{cc}(s)$ is 1.

$$G_{cc}^c(s) = \frac{G_{cc}^o(s)}{1 + G_{cc}^o(s)H_{cc}(s)} = \frac{\omega_{cc}}{s + \omega_{cc}} = \frac{1}{1 + \frac{L_a}{k_{pc}}s} \quad (15)$$

From this, an integration gain of the current control arithmetic unit 12g is expressed by the following Equation (16) and Equation (17). Meanwhile, in the following Equation (16) and the following Equation (17), $i_L^*$ indicates a reactor current command value. $i_{Lf}$ indicates a feedback value of the reactor current value $i_L$. $k_{ic}$ indicates an integration gain of the current control arithmetic unit 12g.

$$v_L^* = \left\{k_{pc}\left(1 + \frac{1}{T_{ic}s}\right)(i_L^* - i_{Lf})\right\}\left(\frac{1}{r_z + sL_a}\right) = L_a \omega_{cc}(i_L^* - i_{Lf}) + \quad (16)$$

-continued $$r_z \omega_{cc}(i_L^* - i_{Lf})$$
$$= k_{pc}(i_L^* - i_{Lf}) + k_{ic}(i_L^* - i_{Lf})$$

$$k_{ic} = r_z \omega_{cc} \qquad (17)$$

Here, when the cut-off angle frequency $\omega_{cc}$ is given by a set cut-off frequency $f_{cc}$ and an adjustment coefficient is provided for arbitrary design thereof, the cut-off angle frequency can be expressed as the following Equation (18), the following Equation (19), and the following Equation (20).

$$k_{pc} = L_a(k_{apc}\omega_{cc}) \qquad (18)$$

$$k_{ic} = r_z(k_{aic}\omega_{cc}) \qquad (19)$$

$$\omega_{cc} = 2\pi f_{cc} \qquad (20)$$

The inductance value $L_a$ of the DC reactor 5a has a superimposition characteristic varying depending on a current. For this reason, pole zero cancellation is realized by holding an inductance map so that the inductance value changes depending on the reactor current value $i_L$ of the DC reactor 5a to make the proportional gain $k_{pc}$ variable.

The block including the current control arithmetic unit 12g performing PI control is designed in this manner, so that an integrator can function to eliminate the influence of the disturbance term $d_1$, and influence on a voltage control side being a major loop can be suppressed. Meanwhile, the block designed in this manner can be expressed by a transfer function of a primary low-pass filter as shown in Equation (15). For this reason, it is possible to stably perform output at a timing of primary delay with respect to an input.

That is, the current control arithmetic unit 12g performs a control arithmetic operation based on PI control and the proportional gain $k_{pc}$ is made variable depending on the reactor current value $i_L$ so that the influence of the disturbance term $d_1$ is cancelled and it is possible to further perform output at a timing of primary delay with respect to an input, and thus it is possible to stabilize response characteristics.

Next, a method of canceling the influence of the disturbance term $d_2$ will be described. In addition, the load current value is includes a DC component (a DC load current value $i_s^{dc}$) and an AC component (an AC load current value $i_s^{ac}$). It is possible to cancel the influence of the disturbance term $d_2$ and the influence of the DC load current value $i_s^{dc}$ by the method described herein.

It is considered that the voltage control arithmetic unit 12b performs a PI control arithmetic operation based on errors between a command value and a feedback value and a gain for canceling the influence of the disturbance term $d_2$ and the influence of the DC load current value $i_s^{dc}$ (a pole zero cancellation gain $k_{ov}$) is added to an arithmetic result. In this case, the pole zero cancellation gain $k_{ov}$ and $[1/sC_s]$ of the modeled step-up/step-down converter 5 illustrated in FIG. 5 are combined with each other, and an open loop of the block including the voltage control arithmetic unit 12b is designed as expressed by the following Equation (21). Meanwhile, in Equation (21), $k_{pv}$ indicates a proportional gain of the voltage control arithmetic unit 12b. $T_{iv}$ is a value obtained by dividing the capacitance value $C_s$ of the secondary-side capacitor 5d by the pole zero cancellation gain $k_{ov}$. $\omega_{cv}$ is a cut-off angle frequency.

$$G_{cv}^o(s) = \left\{k_{pv}\left(1 + \frac{1}{T_{iv}s}\right)\right\}\left(\frac{1}{k_{ov} + sC_s}\right) = \omega_{cv}\frac{1}{s} \qquad (21)$$

From Equation (21), the proportional gain $k_{pv}$ is expressed by the following Equation (22).

$$k_{pv} = C_s \omega_{cv} \qquad (22)$$

In addition, a closed loop of the block is as expressed by the following Equation (23) when using Equation (21) and Equation (22). Meanwhile, in Equation (23), $H_{cv}(s)$ is 1.

$$G_{cv}^c(s) = \frac{G_{cv}^o(s)}{1 + G_{cv}^o(s)H_{cv}(s)} = \frac{\omega_{cv}}{s + \omega_{cv}} = \frac{1}{1 + \frac{C_s}{k_{pv}}s} \qquad (23)$$

From this, an integration gain of the voltage control arithmetic unit 12b is expressed by the following Equation (24) and the following Equation (25). Meanwhile, in the following Equation (24) and the following Equation (25), $v_s^*$ indicates a secondary-side voltage command value. $k_{iv}$ indicates an integration gain of the voltage control arithmetic unit 12b.

$$v_s = \left\{k_{pv}\left(1 + \frac{1}{T_{iv}s}\right)(v_s^* - v_{sf})\right\}\left(\frac{1}{k_{ov} + sC_s}\right) = C_s\omega_{cv}(v_s^* - v_{sf}) + \qquad (24)$$
$$k_{ov}\omega_{cv}(v_s^* - v_{sf})$$
$$= k_{pv}(v_s^* - v_{sf}) + k_{iv}(v_s^* - v_{sf})$$

$$k_{iv} = k_{ov}\omega_{cv} \qquad (25)$$

Here, when the cut-off angle frequency is given by a set cut-off frequency $f_{cv}$ and an adjustment coefficient is provided for arbitrary design thereof, the cut-off angle frequency $\omega_{cv}$ can be expressed as the following Equation (26), the following Equation (27), and the following Equation (28). Meanwhile, the pole zero cancellation gain $k_0$ can be designed by any value, and a value equivalent to a DC load resistance is set.

$$k_{pv} = C_s(k_{apv}\omega_{cv}) \qquad (26)$$

$$k_{iv} = k_{ov}(k_{aiv}\omega_{cv}) \qquad (27)$$

$$\omega_{cv} = 2\pi f_{cv} \qquad (28)$$

The block including the voltage control arithmetic unit 12b performing a control arithmetic operation based on PI control is designed in this manner, and thus an integrator can function to eliminate the influence of the disturbance term $d_2$ and the influence of the DC load current value $i_s^{dc}$. Meanwhile, the block designed in this manner can be expressed by a transfer function of a primary low-pass filter as shown in Equation (23). For this reason, it is possible to perform output at a timing of primary delay with respect to an input.

That is, the voltage control arithmetic unit 12b subtracts a value based on the pole zero cancellation gain $k_{ov}$ from an arithmetic result obtained by performing a control arithmetic operation based on PI control so that the influence of the disturbance term $d_2$ and the influence of the DC load current value $i_s^{dc}$ are cancelled and it is possible to further perform output at a timing of primary delay with respect to an input, and thus it is possible to stabilize response characteristics. Therefore, in the present embodiment, the control device 12 includes the pole zero cancellation control unit 12c that generates a value based on the pole zero cancellation gain $k_{ov}$. In addition, the control device 12 includes a subtractor 12m that subtracts the value generated by the pole zero cancellation control unit 12c from an arithmetic result obtained by performing a control arithmetic operation based on PI control by the voltage control arithmetic unit 12b.

Next, a method of canceling the influence of the AC load current value $i_s^{ac}$ of the load current value $i_s$ will be described. When equation deformation is performed by performing Laplace conversion on Equation (2) which is the above-described state equation, Equation (29) is obtained, and approximation to the following Equation (30) is further performed. Meanwhile, the control device 12 adds a primary low-pass filter to a Laplace operator to treat a differential as incomplete differential, thereby obtaining a primary high-pass filter. In Equation (30), $\omega_{Lh}$ indicates a cut-off angle frequency.

$$i_s = D_{off} i_L - C_s s v_s \qquad (29)$$

$$i_s \approx D_{off} i_L - C_s \left(\frac{\omega_h s}{s + \omega_h}\right) v_s \qquad (30)$$

The influence of the DC load current value $i_s^{dc}$ in the load current value $i_s$ is eliminated by the integrator of the voltage control arithmetic unit 12b. For this reason, considering only suppression of the influence of the AC load current value $i_s^{ac}$, a current command (a load current AC component estimation value $i_s^{est}$) which is expressed by the following Equation (31) equivalent to a second term on the right side of Equation (30) may be applied to an arithmetic result before a reactor current command is generated.

$$i_s^{est} = -C_s \left(\frac{\omega_h s}{s + \omega_h}\right) v_s \qquad (31)$$

Therefore, in the present embodiment, the control device 12 includes the approximation disturbance observer 12e that obtains a load current AC component estimation value $i_s^{est}$ and inputs the obtained load current AC component estimation value to the current command generation unit 12f in order to cancel the influence of the AC load current value $i_s^{ac}$.

The control device 12 of the present embodiment is designed on the basis of an idea that a transfer function representing a plant model is degenerated by canceling the influence of the off duty $D_{off}$, secondary-side voltage value $v_s$, the primary-side voltage value $v_p$, and the load current value $i_x$ as described above.

Referring back to FIG. 2, the voltage command generation unit 12a generates a secondary-side voltage command value $v_s^*$ (voltage command value) indicating a target value of the secondary-side voltage value $v_s$ which is an output voltage (a voltage value on the load side) of the step-up/step-down converter 5. For example, in a case where the load R is a motor, the voltage command generation unit 12a generates the secondary-side voltage command value $v_s^*$ on the basis of a torque command value and the motor rotation speed. The subtractor 12k subtracts the feedback value $v_{sf}$ of the secondary-side voltage value $v_s$ input from the secondary-side voltage detection circuit 11 from the secondary-side voltage command value $v_s^*$ generated by the voltage command generation unit 12a in this manner, and then a value obtained by the subtraction is input to the voltage control arithmetic unit 12b.

The voltage control arithmetic unit 12b receives the value obtained by subtracting the feedback value $v_s^*$ from the secondary-side voltage command value $v_s^*$ from the subtractor 12k, and executes a control arithmetic operation (a control arithmetic operation based on PI control in the present embodiment) for performing adjustment so that the secondary-side voltage value $v_s$ is consistent with the secondary-side voltage command value $v_s^*$. Here, the voltage control arithmetic unit 12b obtains an arithmetic value obtained by performing a proportional arithmetic operation and an integration arithmetic operation on a difference between the secondary-side voltage command value $v_s^*$ and the feedback value $v_{sf}$. Meanwhile, the proportional gain $k_{pv}$ used for a proportional arithmetic operation is set on the basis of the capacitance value $C_s$ and the cut-off angle frequency $\omega_{cv}$ of the secondary-side capacitor 5d of the step-up/step-down converter 5 on the basis of the above-described Equation (26). In addition, the integration gain $k_{iv}$ used for an integration arithmetic operation is set on the basis of the above-described pole zero cancellation gain $k_{ov}$ and cut-off angle frequency $\omega_{cv}$ on the basis of the above-described Equation (27).

The pole zero cancellation control unit 12c stores the pole zero cancellation gain $k_{ov}$ for forming a delay element in a block (system) including a voltage control unit 20 to be described later (including the voltage control arithmetic unit 12b, the subtractor 12k, and the subtractor 12m) and the secondary-side capacitor 5d of the step-up/step-down converter 5, and generates and outputs a value (value based on the pole zero cancellation gain) which is obtained by multiplying the feedback value $v_{sf}$ of the secondary-side voltage value $v_s$ input from the secondary-side voltage detection circuit 11 by the pole zero cancellation gain $k_{ov}$. A delay element is formed in the block including the voltage control unit 20 and the secondary-side capacitor 5d of the step-up/step-down converter 5, whereby it is possible to cancel the influence of the above-described disturbance term $d_2$ serving as a disturbance component on control in the step-up/step-down converter 5 (a disturbance component that cannot be cancelled by decoupling of the off duty $D_{off}$) and the DC load current value $i_s^{dc}$ of the load current value $i_s$. Meanwhile, the pole zero cancellation gain $k_{ov}$ is set such that PI control can be performed on the block including the voltage control arithmetic unit 12b and such that the block including the voltage control arithmetic unit 12b has primary low-pass filter characteristics, together with the proportional gain $k_{pv}$ and the integration gain $k_{iv}$ used by the voltage control arithmetic unit 12b. For example, the pole zero cancellation gain $k_{ov}$ is set to a value equivalent to a DC load resistance.

In addition, as illustrated in FIG. 2, the subtractor 12m subtracts a value generated by the pole zero cancellation control unit 12c from an arithmetic value output from the voltage control arithmetic unit 12b, and a value obtained by the subtraction is input to the current command generation unit 12f.

Meanwhile, as illustrated in FIG. 2, the voltage control unit 20 includes the voltage control arithmetic unit 12b, the subtractor 12k, and the subtractor 12m which are described above. That is, the voltage control unit 20 performs a control arithmetic operation for adjusting the secondary-side voltage value $v_s$ to the secondary-side voltage command value $v_s^*$ on the basis of an arithmetic value obtained by performing a proportional arithmetic operation and an integration arithmetic operation on a difference between the secondary-side voltage value $v_s$ (feedback value $v_{sf}$) and the secondary-side voltage command value $v_s^*$ and a value generated by the pole zero cancellation control unit 12c.

The duty estimator 12d calculates a duty estimation value $D_{off}^{est}$ which is an estimation value of the off duty $D_{off}$ indicating an off period of a switching element (a transistor included in the lower arm 5c) which is disposed on the negative electrode side of the battery 2. Here, the duty estimator 12d calculates a duty estimation value $D_{off}^{est}$ for performing decoupling on the off duty $D_{off}$ serving as a disturbance component on control in the step-up/step-down converter 5 on the basis of the above-described Equation (6). The duty estimator 12d inputs the calculated duty estimation value $D_{off}^{est}$ to the current command generation unit 12f.

The approximation disturbance observer 12e calculates a load current AC component estimation value $i_s^{est}$ which is an estimation value of an AC component of a load current on the basis of the secondary-side voltage value $v_s$ (feedback value $v_{sf}$). Here, the approximation disturbance observer 12e calculates the load current AC component estimation value $i_s^{est}$ for canceling the influence of the AC load current value $i_s^{ac}$ of the load current value $i_s$ serving as a disturbance component on control in the step-up/step-down converter 5 on the basis of the above-described Equation (31). The approximation disturbance observer 12e inputs the calculated load current AC component estimation value $i_s^{est}$ to the current command generation unit 12f.

The current command generation unit 12f generates a reactor current command value $i_L^*$ indicating a target current value to be applied to the DC reactor 5a of the step-up/step-down converter 5 on the basis of arithmetic results of the voltage control unit 20. Here, the current command generation unit 12f generates the reactor current command value $i_L^*$ on the basis of the arithmetic value input from the subtractor 12m, the reciprocal of the duty estimation value $D_{off}^{est}$ input from the duty estimator 12d, and the load current AC component estimation value $i_s^{est}$ input from the approximation disturbance observer 12e. The subtractor 12n subtracts the feedback value $v_{pf}$ of the reactor current value $i_L$ input from the current detection circuit 9 from the reactor current command value $i_L^*$ generated by the current command generation unit 12f, and then a value obtained by the subtraction is input to the current control arithmetic unit 12g.

The current control arithmetic unit 12g performs a control arithmetic operation for adjusting the reactor current value $i_L$ (feedback value $i_{Lf}$) indicating a current value to be applied to the DC reactor 5a to the reactor current command value $i_L^*$ to calculate a reactor voltage command value indicating a target voltage value to be applied to the DC reactor 5a. The current control arithmetic unit 12g receives a value, obtained by subtracting the feedback value $i_{Lf}$ from the reactor current command value $i_L^*$, from the subtractor 12n, and executes a control arithmetic operation (a control arithmetic operation based on PI control in the present embodiment) for making the reactor current value $i_L$ consistent with the reactor current command value $i_L^*$. In this case, the current control arithmetic unit 12g changes the inductance value $L_a$ in accordance with the reactor current value $i_L$ (feedback value $i_{Lf}$) using the above-described inductance map to set a proportional gain $k_{pc}$ (variable proportional gain) on the basis of the cut-off angle frequency $\omega_{cc}$. The current control arithmetic unit 12g outputs an arithmetic value, obtained by performing a proportional arithmetic operation using the proportional gain $k_{pc}$ set in this manner and performing an integration arithmetic operation using the integration gain $k_{ic}$ set on the basis of a combined resistance value $r_z$ (a combined resistance value of an internal resistance value $r_L$ (DC resistance value) of the DC reactor 5a and on-resistance values $r_{SW}$ of the upper arm 5b and the lower arm 5c (switching element)) and the cut-off angle frequency $\omega_{cc}$, as a reactor voltage command value $v_L^*$.

Meanwhile, as illustrated in FIG. 2, the current control unit 30 includes the current control arithmetic unit 12g and the subtractor 12n which are described above. That is, the current control unit 30 calculates an arithmetic value, obtained by performing a proportional arithmetic operation using the proportional gain $k_{pc}$ and an integration arithmetic operation using the integration gain $k_{ic}$ on a difference between the reactor current value $i_L$ (feedback value and the reactor voltage command value $v_L^*$, as a reactor voltage command value $v_L^*$. The proportional arithmetic operation using the proportional gain $k_{pc}$ variable depending on the inductance value $L_a$ and the integration arithmetic operation using the integration gain $k_{ic}$ are performed, whereby the block (system) including the current control unit 30 and the DC reactor 5a has primary low-pass filter characteristics due to a delay element formed therein. As a result, the influence of the disturbance term $d_1$ is cancelled through an integration arithmetic operation, and the reactor voltage command value $v_L^*$ is stably output at a timing of primary delay with respect to the input of the reactor current command value $i_L^*$.

The duty cancellation arithmetic unit 12h receives the reactor voltage command value $v_L^*$ from the current control arithmetic unit 12g and performs arithmetic processing for performing decoupling between the secondary-side voltage value $v_s$ and the primary-side voltage value $v_p$ serving as disturbance components on control in the step-up/step-down converter 5 on the basis of the above-described Equation (7). The duty cancellation arithmetic unit 12h inputs a result of the arithmetic processing to the pulse signal generation unit 12j as a duty command value d.

The carrier generation unit 12i generates a carrier signal constituted by triangular waves for generating a pulse width modulation (PWM) signal in the pulse signal generation unit 12j. The carrier generation unit 12i inputs the generated carrier signal to the pulse signal generation unit 12j. The pulse signal generation unit 12j compares the duty command value d input from the duty cancellation arithmetic unit 12h with the carrier signal received from the carrier generation unit 12i and inputs a comparison result to the gate driving circuit 10 as a driving signal (control signal) of which the logic state changes depending on a comparison result.

Meanwhile, as illustrated in FIG. 2, the control signal generation unit 40 includes the duty cancellation arithmetic unit 12h, the carrier generation unit 12i, and the pulse signal generation unit 12j. That is, the control signal generation unit 40 generates a control signal of the step-up/step-down converter 5 on the basis of the secondary-side voltage value $v_s$, the primary-side voltage value $v_p$, and the reactor voltage command value $v_L^*$.

In such a power system 1 of the present embodiment, when the feedback value $v_{sf}$ of the secondary-side voltage value $v_s$ is input to the control device 12 from the secondary-side voltage detection circuit 11 through a filter, the subtractor 12k subtracts the feedback value $v_{sf}$ from the secondary-side voltage command value $v_s^*$ generated by the voltage command generation unit 12a, and a value obtained by the subtraction is input to the voltage control arithmetic unit 12b.

The voltage control arithmetic unit 12b performs a proportional arithmetic operation using the proportional gain $k_{pv}$ and an integration arithmetic operation using the integration gain $k_{iv}$ on an input value, and an arithmetic value thereof is output from the voltage control arithmetic unit 12b. On the other hand, the pole zero cancellation control unit 12c generates a value obtained by multiplying the feedback value $v_{sf}$ of the secondary-side voltage value $v_s$ by the pole zero cancellation gain $k_{ov}$, and the generated value is output from the pole zero cancellation control unit 12c. The arithmetic value output from the voltage control arithmetic unit 12b and the generated value output from the pole zero cancellation control unit 12c are input to the subtractor 12m, and a value obtained by subtracting the generated value of the pole zero cancellation control unit 12c from the arithmetic value of the voltage control arithmetic unit 12b is output from the subtractor 12m.

In addition, the duty estimator 12d calculates a duty estimation value $D_{off}^{est}$ on the basis of the feedback value $v_{pf}$ of the primary-side voltage value $v_p$ which is input from the primary-side voltage detection circuit 7 through the filter, the feedback value $i_{Lf}$ of the reactor current value $i_L$ which is input from the current detection circuit 9 through the filter, and the feedback value $v_{sf}$ of the secondary-side voltage value $v_s$ which is input from the secondary-side voltage detection circuit 11 through the filter. In addition, the approximation disturbance observer 12e calculates the load current AC component estimation value $i_s^{est}$ on the basis of the feedback value $v_{sf}$ of the secondary-side voltage value $v_s$ which is input from the secondary-side voltage detection circuit 11 through the filter.

The current command generation unit 12f generates a reactor current command value $i_L^*$ on the basis of the value input from the subtractor 12m, the reciprocal of the duty estimation value $D_{off}^{est}$ which is input from the duty estimator 12d, and the load current AC component estimation value $i_s^{est}$ which is input from the approximation disturbance observer 12e. The reactor current command value $i_L^*$ is output from the current command generation unit 12f and is input to the subtractor 12n.

The subtractor 12n subtracts the feedback value $i_{Lf}$ of the reactor current value $i_L$ from the reactor current command value $i_L^*$ which is input from the current command generation unit 12f, and a value obtained by the subtraction is input to the current control arithmetic unit 12g.

The current control arithmetic unit 12g performs a proportional arithmetic operation using the variable proportional gain $k_{pc}$ and an integration arithmetic operation using the integration gain $k_{ic}$ on an input value, and an arithmetic value thereof is output from the current control arithmetic unit 12g as a reactor voltage command value $v_L^*$. The reactor voltage command value $v_L^*$ output from the current control arithmetic unit 12g is input to the duty cancellation arithmetic unit 12h.

The duty cancellation arithmetic unit 12h generates a duty command value d on the basis of the reactor voltage command value $v_L^*$ input from the duty cancellation arithmetic unit 12h, the feedback value $v_{sf}$ of the secondary-side voltage value $v_s$, and the feedback value $v_{pf}$ of the primary-side voltage value $v_p$. The pulse signal generation unit 12j generates a control signal to be input to the step-up/step-down converter 5 on the basis of the duty command value d generated by the duty cancellation arithmetic unit 12h and the carrier signal generated by the carrier generation unit 12i.

When the control signal generated by the control device 12 in this manner is input to the step-up/step-down converter 5, the power of the battery 2 is stepped up on the basis of the control signal, and the stepped-up power is supplied to the inverter 6. The power input to the inverter 6 is converted into AC power and is then supplied to the load R.

According to the above-described control device 12 of the present embodiment, a delay element is formed in the block including the voltage control unit 20 and the secondary-side capacitor 5d of the step-up/step-down converter 5 on the basis of the pole zero cancellation gain $k_{ov}$. For this reason, a residual component (the influence of the disturbance term $d_2$ and the influence of the DC load current value $i_s^{dc}$) of a disturbance component which remains even when a current command value is multiplied by a reciprocal of an off duty $D_{off}$ (duty estimation value $D_{off}^{est}$) can be absorbed through an integration arithmetic operation of the voltage control unit 20. Therefore, according to the control device 12 of the present embodiment, it is possible to further suppress the influence of a disturbance component on control which is included in the step-up/step-down converter 5 and to stabilize the supply of power to the load R without making control gains (the proportional gain $k_{pv}$ and the integration gain $k_{iv}$) in the voltage control unit 20 variable.

Further, in the control device 12 of the present embodiment, the pole zero cancellation control unit 12c generates a value obtained by multiplying the secondary-side voltage value $v_s$ by the pole zero cancellation gain $k_{ov}$, and the voltage control unit 20 includes the subtractor 12k that subtracts the value generated by the pole zero cancellation control unit 12c from an arithmetic value obtained by performing a proportional arithmetic operation and an integration arithmetic operation on a difference between the secondary-side voltage value $v_s$ and the secondary-side voltage command value $v_s^*$. For this reason, it is possible to suppress the influence of a disturbance component on control which is included in the step-up/step-down converter 5 by only performing simple arithmetic operation in the voltage control unit 20.

Further, in the control device 12 of the present embodiment, the pole zero cancellation gain $k_{ov}$ is set to a value equivalent to a DC load resistance. The pole zero cancellation gain $k_{ov}$ can be set to any value. However, the pole zero cancellation gain $k_{ov}$ is set to a value equivalent to a DC load resistance, and thus it is possible to easily set the pole zero cancellation gain $k_{ov}$ for suppressing the influence of a disturbance component on control which is included in the step-up/step-down converter 5.

In addition, the control device 12 of the present embodiment includes the approximation disturbance observer 12e that calculates the load current AC component estimation value $i_s^{est}$ which is an estimation value of an AC component of a load current on the basis of the secondary-side voltage value $v_s$, and the current command generation unit 12f generates the reactor current command value $i_L^*$ on the basis of the load current AC component estimation value $i_s^{est}$, in addition to an arithmetic result of the voltage control unit 20 and a reciprocal of the duty estimation value $D_{off}^{est}$. According to such a control device 12 of the present embodiment, it is possible to cancel the influence of the AC load current value $i_s^{ac}$ serving as a disturbance component on control which is included in the step-up/step-down converter 5 and to further stabilize the supply of power to the load R.

Further, in the control device 12 of the present embodiment, the proportional gain $k_{pv}$, the integration gain $k_{iv}$, and the pole zero cancellation gain $k_{ov}$ of the voltage control unit 20 are set such that the block including the voltage control unit 20 and the secondary-side capacitor 5d of the step-up/step-down converter 5 has a primary delay characteristic. For this reason, in the control device 12 of the present embodiment, the secondary-side voltage command value $v_s^*$ is input, and it is possible to set responsiveness of the secondary-side voltage value $v_s$ with respect to the input to be a primary delay characteristic and to stabilize control.

Further, in the control device 12 of the present embodiment, the proportional gain $k_{pv}$ is set on the basis of the capacitance value $C_s$ of the secondary-side capacitor 5d of the step-up/step-down converter 5 and the cut-off angle frequency $\omega_{cv}$, and the integration gain $k_{iv}$ is set on the basis of the pole zero cancellation gain $k_{ov}$ and the cut-off angle frequency $\omega_{cv}$. The proportional gain $k_{pv}$ and the integration gain $k_{iv}$ are set in this manner, whereby the block including the voltage control unit 20 and the secondary-side capacitor 5d of the step-up/step-down converter 5 can be set to have a primary delay characteristic.

In addition, the control device 12 of the present embodiment includes the current control unit 30 that performs a control arithmetic operation for adjusting the reactor current value $i_L$ indicating a current value to be applied to the DC reactor 5a to the reactor current command value $i_L^*$ to calculate the reactor voltage command value $v_L^*$ indicating a target voltage value to be applied to the DC reactor 5a, and the control signal generation unit 40 that generates a control signal of the step-up/step-down converter 5 on the basis of the secondary-side voltage value $v_s$, the primary-side voltage value $v_p$, and the reactor voltage command value $v_L^*$. Further, the current control unit 30 calculates an arithmetic value, obtained by performing a proportional arithmetic operation using the proportional gain $k_{pc}$ set to be variable on the basis of the cut-off angle frequency $\omega_{cc}$ and the inductance value $L_a$ of the DC reactor 5a and an integration arithmetic operation using the integration gain $k_{ic}$ set on the basis of the combined resistance value $r_z$ (a combined resistance value of the internal resistance value $r_L$ of the DC reactor 5a and the on-resistance values $r_{SW}$ of the upper arm 5b and the lower arm 5c of the step-up/step-down converter 5) and the cut-off angle frequency $\omega_{cc}$ on a difference between the reactor current value $i_L$ and the reactor current command value $i_L^*$, as the reactor voltage command value $v_L^*$. According to such a control device 12 of the present embodiment, it is possible to eliminate some of disturbance components caused by the secondary-side voltage value $v_s$ and the primary-side voltage value $v_p$ which are included in the step-up/step-down converter 5 by using the secondary-side voltage value $v_s$ and the primary-side voltage value $v_p$ in the control signal generation unit 40 and to further eliminate the rest of the disturbance components by using the proportional gain $k_{pc}$ set to be variable by the current control unit 30. Therefore, according to the control device 12 of the present embodiment, it is possible to eliminate the influence of a disturbance component on control caused by the secondary-side voltage value $v_s$ and the primary-side voltage value $v_p$.

While preferred embodiment of the present invention has been described with reference to the accompanying drawings, it is needless to say that the present invention is not limited to the embodiment. The shapes and combinations of the constituent members shown in the above-described embodiment are merely examples, and various modifications can be made on the basis of design requirements and the like without departing from the scope of the present invention.

For example, in the embodiment, a configuration in which the control device 12 includes the duty estimator 12d and the approximation disturbance observer 12e has been described. However, the present invention is not limited thereto. The present invention can also adopt a configuration in which the control device 12 does not include either one or both of the duty estimator 12d and the approximation disturbance observer 12e.

Further, in the embodiment, a configuration in which the duty cancellation arithmetic unit 12h eliminates a disturbance component on control caused by the primary-side voltage value $v_p$ and the secondary-side voltage value $v_s$ has been described. However, the present invention is not limited thereto. It is also possible to adopt a configuration in which a command value generation unit generating the duty command value d without eliminating a disturbance component on control caused by the primary-side voltage value $v_p$ and the secondary-side voltage value $v_s$ is provided instead of the duty cancellation arithmetic unit 12h or a configuration in which the command value generation unit is functionally incorporated into the current control arithmetic unit.

REFERENCE SIGNS LIST

1 Power system
2 Battery (DC power source)
3 Contactor
4 Primary-side capacitor
5 Step-up/step-down converter (step-up converter)
5a DC reactor
5b Upper arm
5c Lower arm
5d Secondary-side capacitor (load-side capacitor)
6 Inverter
7 Primary-side voltage detection circuit
8 Current sensor
9 Current detection circuit
10 Gate driving circuit
11 Secondary-side voltage detection circuit
12 Control device
12a Voltage command generation unit
12b Voltage control arithmetic unit
12c Pole zero cancellation control unit
12d Duty estimator
12e Approximation disturbance observer
12f Current command generation unit
12g Current control arithmetic unit
12h Duty cancellation arithmetic unit
12i Carrier generation unit
12j Pulse signal generation unit
12k Subtractor
12m Subtractor
12n Subtractor
20 Voltage control unit
30 Current control unit
40 Control signal generation unit
R Load

What is claimed is:

1. A control device for a step-up converter which controls the step-up converter connected between a load and a DC power source, the control device comprising:
a voltage control unit that performs a control arithmetic operation for adjusting a voltage value on the load side of the step-up converter to a voltage command value;
a current command generation unit that generates a reactor current command value indicating a target current value to be applied to a DC reactor of the step-up converter on the basis of an arithmetic result of the voltage control unit;
a duty estimator that calculates a duty estimation value which is an estimation value of an off duty indicating an off period of a switching element of the step-up converter disposed on a negative electrode side of the DC power source; and a pole zero cancellation control unit that stores a pole zero cancellation gain for forming a delay element in a system including the voltage control unit and a load-side capacitor of the step-up converter and generates a value based on the pole zero cancellation gain, wherein the voltage control unit performs the control arithmetic operation on the basis of a calculated value, obtained by performing a proportional arithmetic operation and an integration arithmetic operation on a difference between a voltage value on the load side and the voltage command value, and a value generated by the pole zero cancellation control unit, and the current command generation unit generates the reactor current command value on the basis of the arithmetic result of the voltage control unit and a reciprocal of the duty estimation value.

2. The control device for the step-up converter according to claim 1, wherein the pole zero cancellation control unit generates a value obtained by multiplying the voltage value on the load side by the pole zero cancellation gain, and the voltage control unit includes a subtractor that subtracts the value generated by the pole zero cancellation control unit from the arithmetic value obtained by performing the proportional arithmetic operation and the integration arithmetic operation on the difference between the voltage value on the load side and the voltage command value.

3. The control device for the step-up converter according to claim 1, wherein the pole zero cancellation gain is set to a value equivalent to a DC load resistance.

4. The control device for the step-up converter according to claim 1, further comprising:

an approximation disturbance observer that calculates a load current AC component estimation value which is an estimation value of an AC component of a load current on the basis of the voltage value on the load side, wherein the current command generation unit generates the reactor current command value on the basis of the load current AC component estimation value, in addition to the arithmetic result of the voltage control unit and the reciprocal of the duty estimation value.

5. The control device for the step-up converter according to claim 1, wherein a proportional gain, an integration gain, and a pole zero cancellation gain of the voltage control unit are set such that the system including the voltage control unit and the load-side capacitor of the step-up converter has a primary delay characteristic.

6. The control device for the step-up converter according to claim 5, wherein the proportional gain is set on the basis of a capacitance value and a cut-off angle frequency of the load-side capacitor of the step-up converter, and the integration gain is set on the basis of the pole zero cancellation gain and the cut-off angle frequency.

7. The control device for the step-up converter according to claim 1, further comprising:

a current control unit that performs a control arithmetic operation for adjusting a reactor current value indicating a current value to be applied to the DC reactor to the reactor current command value to calculate a reactor voltage command value indicating a target voltage value to be applied to the DC reactor; and a control signal generation unit that generates a control signal of the step-up converter on the basis of the voltage value on the load side, a voltage value on the DC power source side of the step-up converter, and the reactor voltage command value, wherein the current control unit calculates an arithmetic value, obtained by performing a proportional arithmetic operation using a variable proportional gain set to be variable on the basis of the cut-off angle frequency and an inductance value of the DC reactor and an integration arithmetic operation using an integration gain set on the basis of the cut-off angle frequency and a combined resistance value of a DC resistance value of the DC reactor and an on-resistance of the switching element of the step-up converter on a difference between the reactor current value and the reactor current command value, as the reactor voltage command value.

* * * * *